Aug. 9, 1938.   W. W. HUSTON   2,126,469
CALENDAR CLOCK
Filed Oct. 21, 1935   9 Sheets-Sheet 1

FIG. I.

INVENTOR
W. W. HUSTON
BY
ATTORNEYS.

INVENTOR
W. W. HUSTON
BY
ATTORNEYS

Aug. 9, 1938.   W. W. HUSTON   2,126,469
CALENDAR CLOCK
Filed Oct. 21, 1935   9 Sheets-Sheet 3

FIG. 3.

INVENTOR
W. W. HUSTON.
BY
ATTORNEYS

FIG. 4.

Aug. 9, 1938.  W. W. HUSTON  2,126,469
CALENDAR CLOCK
Filed Oct. 21, 1935  9 Sheets-Sheet 5

INVENTOR
W. W. HUSTON.
BY
ATTORNEYS.

Aug. 9, 1938. W. W. HUSTON 2,126,469
CALENDAR CLOCK
Filed Oct. 21, 1935 9 Sheets-Sheet 6

INVENTOR.
W. W. HUSTON.
ATTORNEYS

Aug. 9, 1938.　　W. W. HUSTON　　2,126,469
CALENDAR CLOCK
Filed Oct. 21, 1935　　9 Sheets-Sheet 7

INVENTOR
W. W. HUSTON
BY *[signature]*
ATTORNEYS.

Aug. 9, 1938.　　　W. W. HUSTON　　　2,126,469
CALENDAR CLOCK
Filed Oct. 21, 1935　　　9 Sheets-Sheet 8

INVENTOR
W. W. HUSTON.
BY

ATTORNEYS.

Aug. 9, 1938.  W. W. HUSTON  2,126,469
CALENDAR CLOCK
Filed Oct. 21, 1935   9 Sheets-Sheet 9

INVENTOR
W. W. HUSTON.
BY
ATTORNEYS.

Patented Aug. 9, 1938

2,126,469

UNITED STATES PATENT OFFICE 2,126,469

CALENDAR CLOCK

William Warden Huston, Windsor, Ontario, Canada

Application October 21, 1935, Serial No. 45,920

10 Claims. (Cl. 40—112)

My invention relates to improvements in calendar clocks, and the object of the invention is to devise a mechanism operated by an ordinary clock mechanism for indicating automatically the successive week day, month and year dates of the calendar in their proper succession, and it consists essentially of the arrangement and construction of parts as hereinafter more particularly explained.

In the drawings.

In the drawings like characters of reference indicate corresponding parts in the different views.

The clock case is designated by the numeral 1 provided with the usual dial 2 and front opening 3 preferably provided with a protective glass 4 through which the calendar indications are visible. 5 and 6 are orifices formed in the side walls of the case 1 through which extend the knurled knobs for rotatively adjusting the indicating wheels as hereinafter described.

A frame formed by a bottom plate 7, side plates 8 and 9 and top plate 10 fits within the case 1 and on which my mechanism is carried. Front and back closure plates 10× and 10° are provided, the front plate 10× being provided with viewing orifices 11×, 11°, 12× and 12°. A clock mechanism 11 is supported on the plate 10 of which 12 is the minute shaft and 13 the hour shaft to which are secured the minute-hand 14 and hour-hand 15 in the usual way. In the side plates 8 and 9 are bearing orifices 8× and 9× and 16 is a standard having a bearing orifice 16× in a line with the orifices 8× and 9×.

A main supporting shaft comprises two shaft members 17 and 18, the outer portions of which are journalled in the orifices 8× and 9× and their inner abutting portions in the orifice 16× of the standard 16. 17× is a knurled knob screwed onto the outer end of the shaft member 17 and 18× is a knurled knob screwed onto the outer end of the shaft member 18.

Figure 1:
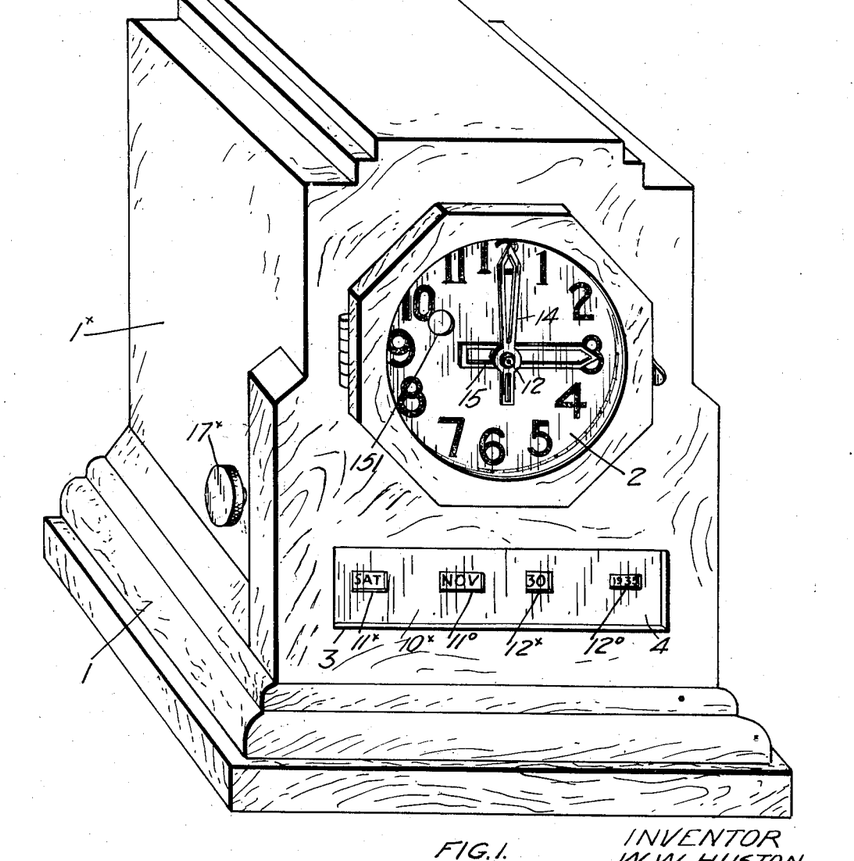
Fig. 1 is a perspective view of my clock.
Figures 2, 24:
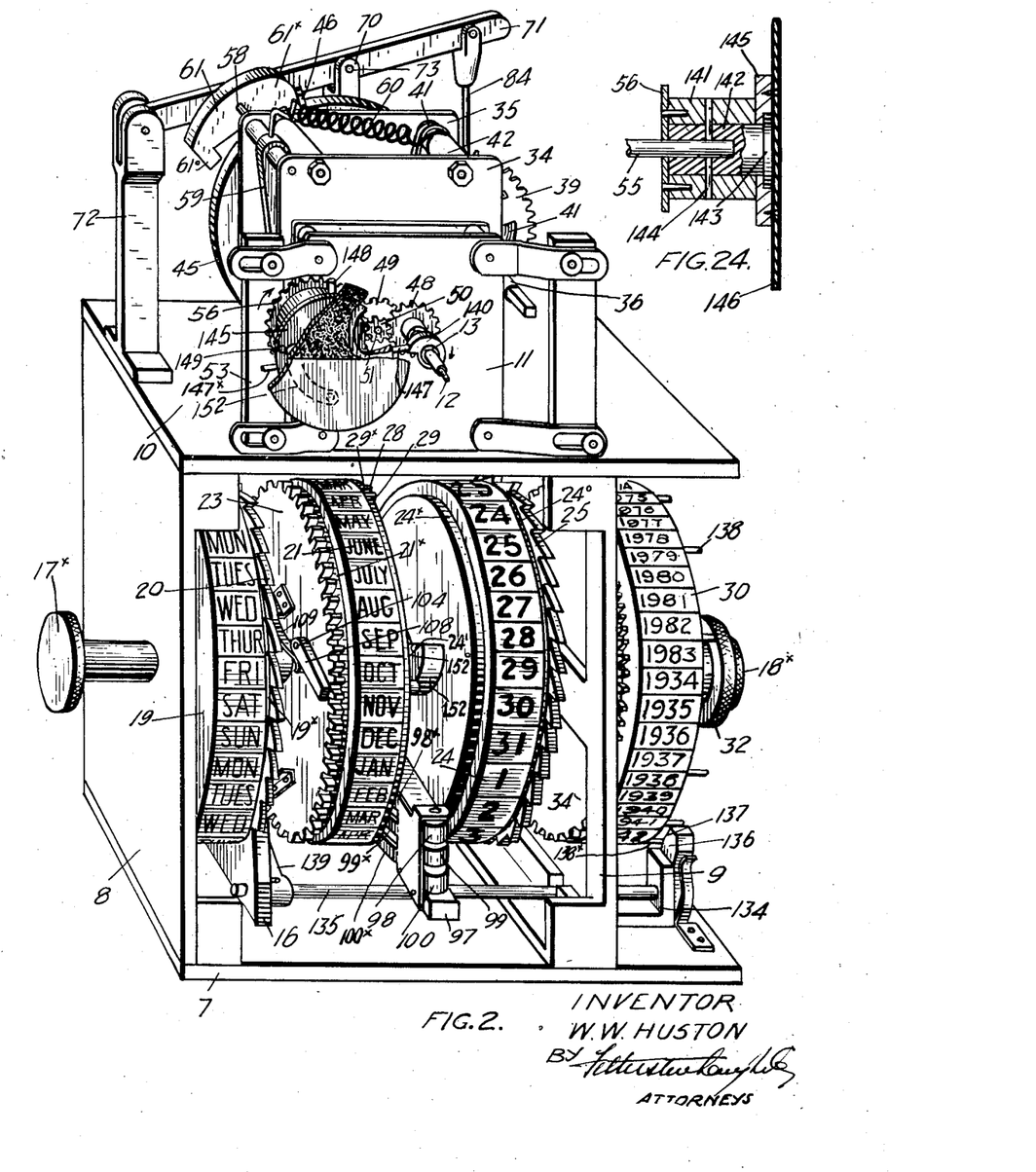
Fig. 2 is an enlarged perspective detail of the mechanism removed from the clock case, with certain parts broken away to more clearly show certain mechanisms.
Fig. 24 is a sectional view on line 24—24 of Fig. 20.
Figure 3:
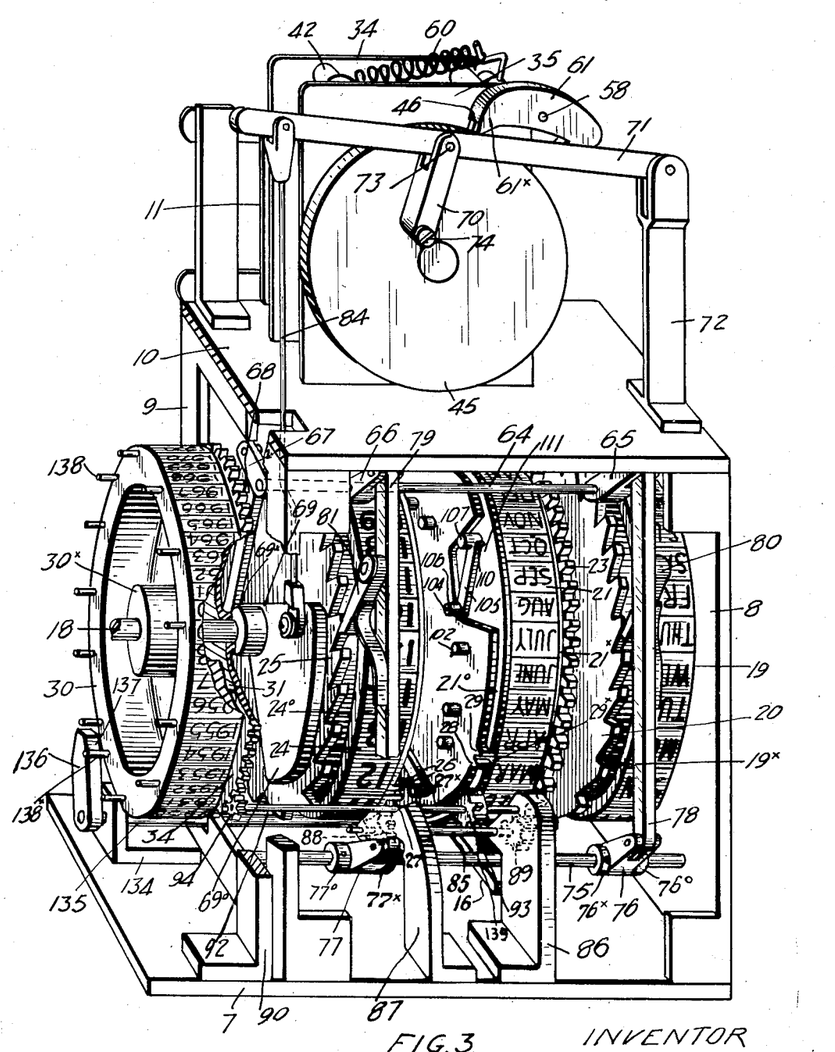
Fig. 3 is a similar view to Fig. 2 looking at the reverse side.

A week day wheel 19 is freely mounted on the shaft member 17 and provided, at one edge, with an annular rabbet groove 19×. Secured to or formed integral with the wheel 19 is a ratchet wheel 20, the teeth of which correspond in number to the number of week day divisions on the periphery of the wheel 19 and are opposite the rabbet groove 19× to permit of free engagement with their operating pawl. The periphery of the wheel 19 is preferably divided into thirty-five divisions so as to accommodate the days for five successive weeks which are inscribed thereon as indicated in Figs. 2 and 3.

Figures 7, 10, 15, 16:
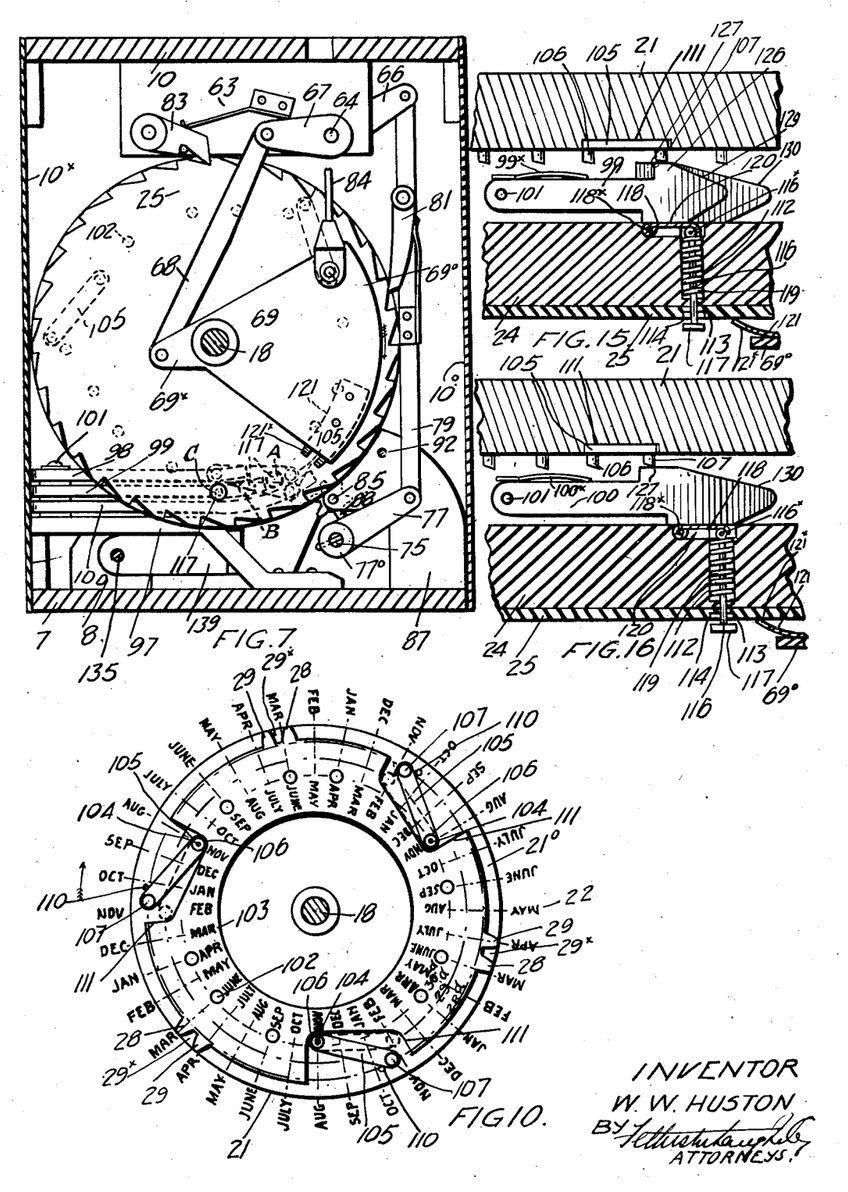
Fig. 7 is a cross sectional view on line 7—7 of Fig. 4.
Fig. 10 is a face elevation of the month wheel and indicating the relative position of the actuating pins on the wheel face to the month indications on the wheel periphery.
Fig. 15 is a similar view to Figs. 12 to 14 inclusive showing the mechanism in position when changing from a 29th day indication to a first day indication of the next succeeding month.
Fig. 16 is a similar view to Figs. 12 to 15 inclusive showing the mechanism in position when changing from a 28th day indication to a first day indication of the next succeeding month.

A month wheel 21 is divided on its periphery into thirty-six spaces so as to be equal in circumference to the week day wheel 19 and to accommodate the month indications for three years as indicated in Fig. 10 by the outer circle of month indications 22. The wheel 21 is provided on one face with a rabbet groove 21× and on the opposite face with a rabbet groove 21⁰. A gear wheel 23 is provided with seventy-two teeth, two teeth corresponding to each peripheral month space of the wheel 21 and having the space between each two sets of two teeth centred opposite the centre of each month space of the month wheel.

A "day of the month" wheel 24 is divided into thirty-one spaces to correspond with the greatest number of days in a month. The wheel 24 is provided, on one face, with a rabbet groove 24× and on the opposite face with a rabbet groove 24⁰. Secured to or formed integral with the wheel 24 is a ratchet wheel 25, the teeth of which are opposite the rabbet groove 24⁰. Within the rabbet groove 24× are two teeth 26 and 27, the interspace or recess 27× extending laterally into the body of the wheel as indicated in Fig. 3.

The month wheel 21 is provided with three sets of teeth 28 and 29 in the rabbet groove 21⁰ and having their interspace 29× extending into the body of the wheel 21 for a purpose which will hereinafter appear.

A year wheel 30 is divided on its periphery into fifty spaces containing successively the year dates from 1934 to 1983 inclusive and is provided centrally with a tubular hub 30×. Against the left hand or inner face of the year wheel 30 fits a ratchet wheel 31 having fifty teeth corresponding in number to the number of years on the year wheel. The centre of the ratchet wheel is provided with a tubular hub. A collar 18⁰ fits against the hub 31× and is secured to the shaft member 18 by a set screw 31⁰.

A tubular nut 32 is provided with a central bore 33 fitting around the nut 18× and having an enlarged inner end 33× fitting around the exterior periphery of the collar 18⁰. The nut 32 is connected to the hub 30× by a pin 31'. By this means you can adjust the year wheel 30 by turning the tubular nut 32 from the outer side of the case 1⁰. A gear disc 34 is provided with a hundred teeth, that is two for each tooth of the ratchet wheel and each year space of the disc 30.

The month wheel 21 and year wheel 30 are mounted to revolve freely around the shaft member 18. The day of the month wheel 24 is provided with a pin 24' engaging in a segmental recess 152⁰ formed in the annular flange 152× of the sleeve 152 secured by a set screw 153 to the shaft 18 so as to be controlled by the knob 18×.

I will now describe the means by which the week day wheel and month day wheel are rotated a week day space and a month day space at the end of each twenty-four hours which preferably terminates at midnight and through which the month wheel is rotated a month space at the end of each revolution of the "day of the month" wheel and the year wheel at the end of each 1/3 revolution of the month wheel.

In the frame plates 34 and 35 is journalled a shaft 36 which acts as a winding stem and on which is secured a rachet wheel 37 and on which is freely mounted a gear 39 on which is pivoted a dog 40 engaging the ratchet 37. A clock spring 41 is connected at one end to the shaft 36 and at the opposite end to the frame post 42 so as to drive the gear 39 when the spring is wound tight through the sprocket 37 and dog 40. Meshing with the gear 39 is a pinion 43 secured to a shaft 44 which is also journalled in the plates 34 and 35 and to which is also secured the crank disc 45 from the periphery of which extends a pin 46.

Figures 6, 20:
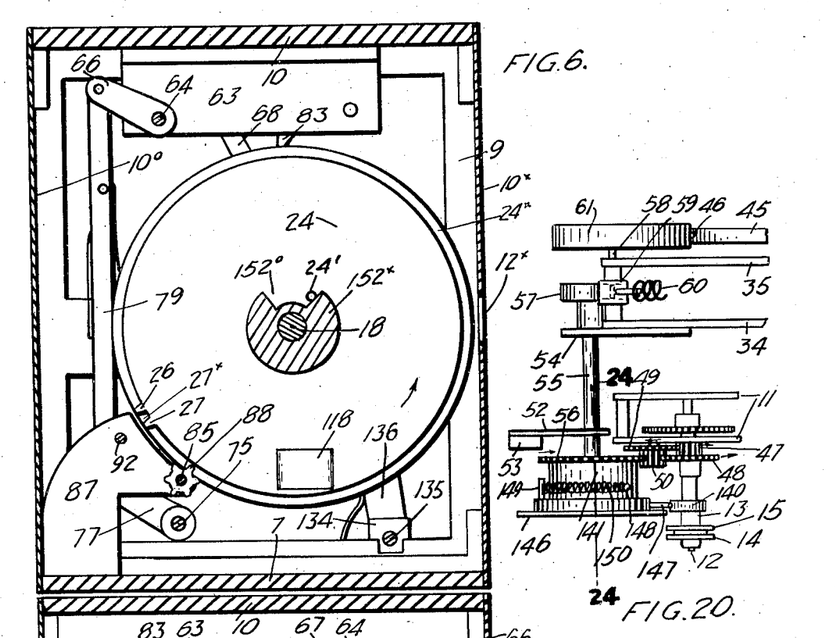
Fig. 6 is a cross sectional view on line 6—6 of Fig. 4.
Fig. 20 is a plan detail of the mechanism for operating my device every twenty-four hours.

On the minute shaft is secured a pinion 47 (Fig. 20) and on the tubular hour shaft is secured a gear 48. The pinion 47 and gear 48 are connected by the integral gear and pinion 49 and 50 mounted on the stud shaft 51. The pinions 47 and 50 and gears 48 and 49 form a twelve to one drive between the minute and hour shafts in accordance with the usual practice.

Journalled in the bracket 52 carried by the standard 53 and the bracket 54 carried by the plate 34 is a shaft 55 on which is secured a gear wheel 56 in the manner hereinafter described. The gear 56 has a twenty-four to one ratio with the pinion 47 of the minute shaft. On the opposite end of the shaft 55 is secured a cam 57.

The gear 56 rotates in a clockwise direction as indicated by arrow in Fig. 2. The gear 56 is connected to the minute hand shaft of the clock work by means of the pinion 50, gear 49 and pinion 47 which is secured to the minute shaft.

Figure 23:
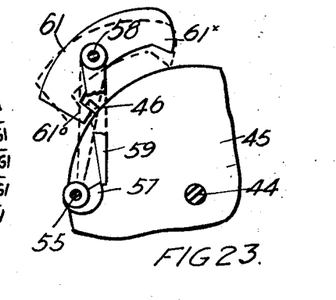

In the plates 34 and 35 is journalled a rock shaft 58. To the rock shaft 58 is secured a tripping finger 59 coacting with the periphery of the cam 57 and held thereagainst by means of the tension spring 60. Coacting with the pin 46 is an escapement detent 61 secured to the rock shaft 58. The nose 61× of the detent normally engages the pin 46, the inward projection 61⁰ of the detent holding the pin in its final tripping position as indicated by the positions illustrated in Figs. 22 and 23.

Journalled in brackets 62 and 63 secured to the bottom face of the top plate 10 is a rock shaft 64 to which is secured the rearwardly directed arms 65 and 66 and the forwardly directed arm 67. The arm 67 is connected by a link 68 to the forwardly extended end 69× of a main operating lever 69 which is swung on the shaft member 18 (Fig. 3).

Connected to the crank disc 45 by a link 70 is a lever 71 pivotally mounted at one end upon a bracket 72. The link 70 is pivotally connected at one end at 73 to the lever 71 and at the opposite end at 74 to the crank wheel 45.

Adjacent the bottom plate 7 in the side plates 8 and 9 is journalled a rock shaft 75 directly beneath the rock shaft 64 and on which are swung arms 76 and 77 between collars 78×, 76⁰ and 77×, 77⁰ connected by link bars 78 and 79 to the arms 65 and 66. On the link bars 78 and 79 are pivotally mounted spring pressed pawls 80 and 81 respectively engaging the teeth of the ratchets 20 and 25. Dogs 82 and 83 engage the ratchet wheels 20 and 25 to prevent reverse rotation.

The rear end 69⁰ of the lever 69 is connected by a link rod 84 to the corresponding end of the lever 71.

Figures 9, 21, 22:
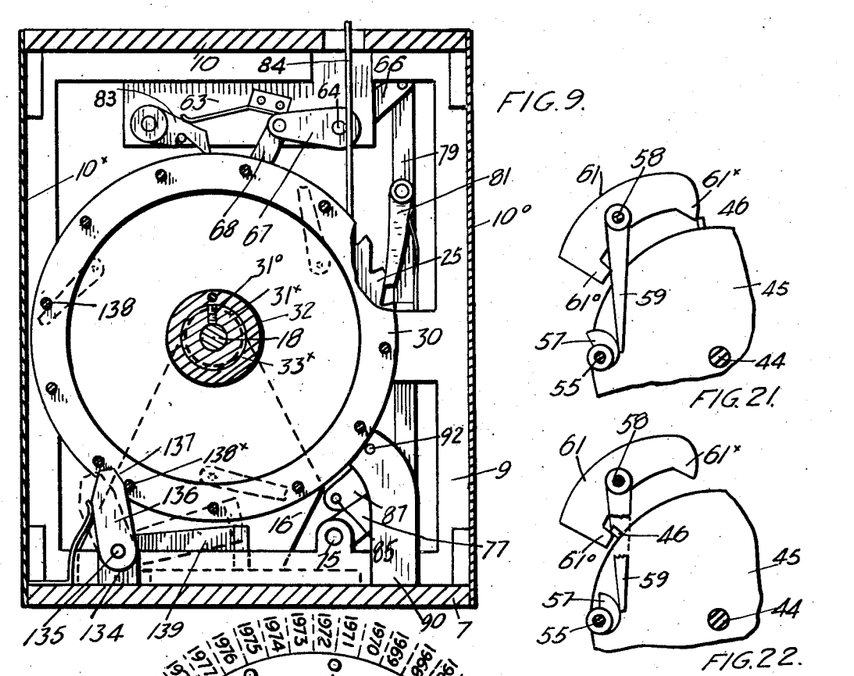
Fig. 9 is a sectional view on line 9—9 of Fig. 4.
Figs. 21, 22, and 23 are detail views showing the various positions of the trip or escapement mechanism.

As the hands of the clock revolve towards twelve o'clock midnight, the cam 57 rotates to the position indicated in Fig. 21 carrying the nose 61× of the detent 61 clear of the pin 46 thereby releasing the crank wheel 45 permitting it to revolve until the pin 46 engages the detent projection 61⁰ which is swung inwardly by the cam 57 and finger 59. As the hands of the clock indicate twelve o'clock midnight the cam 57 assumes the position illustrated in Fig. 23, the tripping finger 59 tripping off the cam 57 to assume the dotted position illustrated in this figure so as to release the pin 46 from the projection 61⁰ and carry the nose 61× to adjacent the periphery of the crank wheel and into the path of the pin 46 against which it is stopped as the crank wheel 45 completes its revolution.

By the revolving of the crank wheel 45, the lever 71 is reciprocated which, by means of the link rod 84, reciprocates the lever 69 rocking the shaft 64 by means of the link 68 and arm 67. The rocking of the shaft 64 vertically reciprocates the pawls 80 and 81 by means of the arms 65 and 66, rocking shaft 75 and arms 76 and 77 and link bars 78 and 79. By this means the ratchet wheels 20 and 25 are rotated the space of one tooth carrying the next week-day indication and the next "day of the month" indication opposite the exhibiting orifices 11× and 12×. In every thirty-one day month the "day of the month" wheel in its normal step by step rotation indicates successively the thirty-first day of one month and the first day of the next month.

The operation of my device is first considered in relation to thirty-one day months. In order to operate the month wheel at the end of each thirty-one days I provide the following mechanism.

Figures 8, 25:
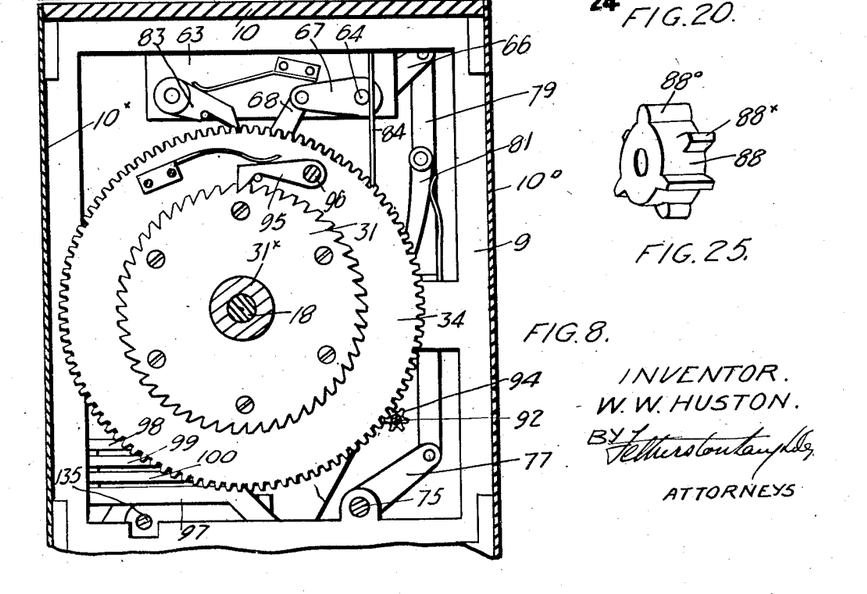
Fig. 8 is a sectional view on line 8—8 of Fig. 4.
Fig. 25 is an enlarged perspective detail of one of the pinions coacting with the "day of the month" wheel or month wheel.

A shaft 85 is journalled in the standards 86 and 87. A pinion 88 is secured to the shaft every other tooth 88× of which is a half length tooth (see Fig. 25). The relation of the pinion 88 to teeth 26, 27 is the same as that which pinion 93 and teeth 28, 29 bear to each other and which is shown in Fig. 3 and described subsequently in the specification. As the "day of the month" wheel revolves, the tooth 27 engages one of the half length teeth 88× rotating the pinion so that a full length tooth 88⁰ meshes in between the teeth 27 and 26 and the tooth 26 is engaged by the next half tooth 88× of the pinion, the pinion rotating until the next succeeding full length tooth engages the periphery of the "day of the month" wheel preventing its further rotation. The position of the teeth 26 and 27 on the periphery of the "day of the month" wheel is such that they engage with the pinion as the numbers appearing through the exhibiting orifice 11× change from thirty-one to one.

On the opposite end of the shaft 85 is secured a gear pinion 89 meshing with the gear wheel 23. The rotation of the pinion 88 by the gear teeth 26 and 27 is sufficient to rotate the gear 23 through the shaft 85 and pinion 89 a distance of two teeth which corresponds to a month space on the periphery of the month wheel 21 so as to change the month indications appearing through the exhibiting orifice 11⁰ to the next successive month indication.

In order to provide a similar operation between the month wheel 21 and the year wheel 30, I provide a similar mechanism in which the month wheel is provided, as before described, in its rabbet groove 21⁰ with a pair of teeth 28 and 29 for each twelve month period inscribed on the periphery of the wheel. In the standards 86 and 87 and standard 90 is journalled a shaft 92 (Figs. 3 and 9) on which is secured a pinion 93 similar to the pinion 88 and with which the teeth 28 and 29 engage when the last month indication December appears through the exhibiting orifice 11⁰. As the month wheel revolves from the December indication to the January indication, the teeth 28 and 29 rotate the pinion 93. The pinion 94 secured to the opposite end of the shaft 92 by this operation rotates the gear 34 a space of two teeth and consequently rotating the ratchet wheel 31 a space of one tooth. The year wheel 30 is provided with a pivoted dog 95 supported on a stud 96 extending from the face of the year wheel and spring pressed against the ratchet wheel 31. By this means the year wheel is rotated so as to successively change the year appearing through the exhibiting orifice 12⁰ at the end of each twelve month period indicated on the periphery of the month wheel 21.

I will now describe the means by which the difference in the different number of days in a month is compensated for.

On the base plate 7 is secured a bracket 97 on which are pivotally secured cam pieces 98, 99 and 100 by a stud bolt 101 and individually pressed by springs 98×, 99× and 100×. The cam piece 98 controls the mechanism for a thirty day month, the cam piece 99 for a twenty-nine day month and the cam piece 100 for a twenty-eight day month.

From the face of the month wheel 21 adjacent to the "day of the month" wheel extends a series of pins 102 arranged in a concentric circle 30ᵈ, (see Fig. 10) one for each thirty day month and in a position ninety degrees from the month indication appearing through the exhibiting orifice 11⁰ as indicated by the inner circle of month indications inscribed at 103 in Fig. 10 of the drawings. It will, of course, be understood that the inner circle of month indications 103 are only provided in the drawings for the sake of clearer understanding of the operation and are not used in actual practice.

Figures 5, 12, 13, 14, 17, 18, 19, 29, 37, 38, 39:
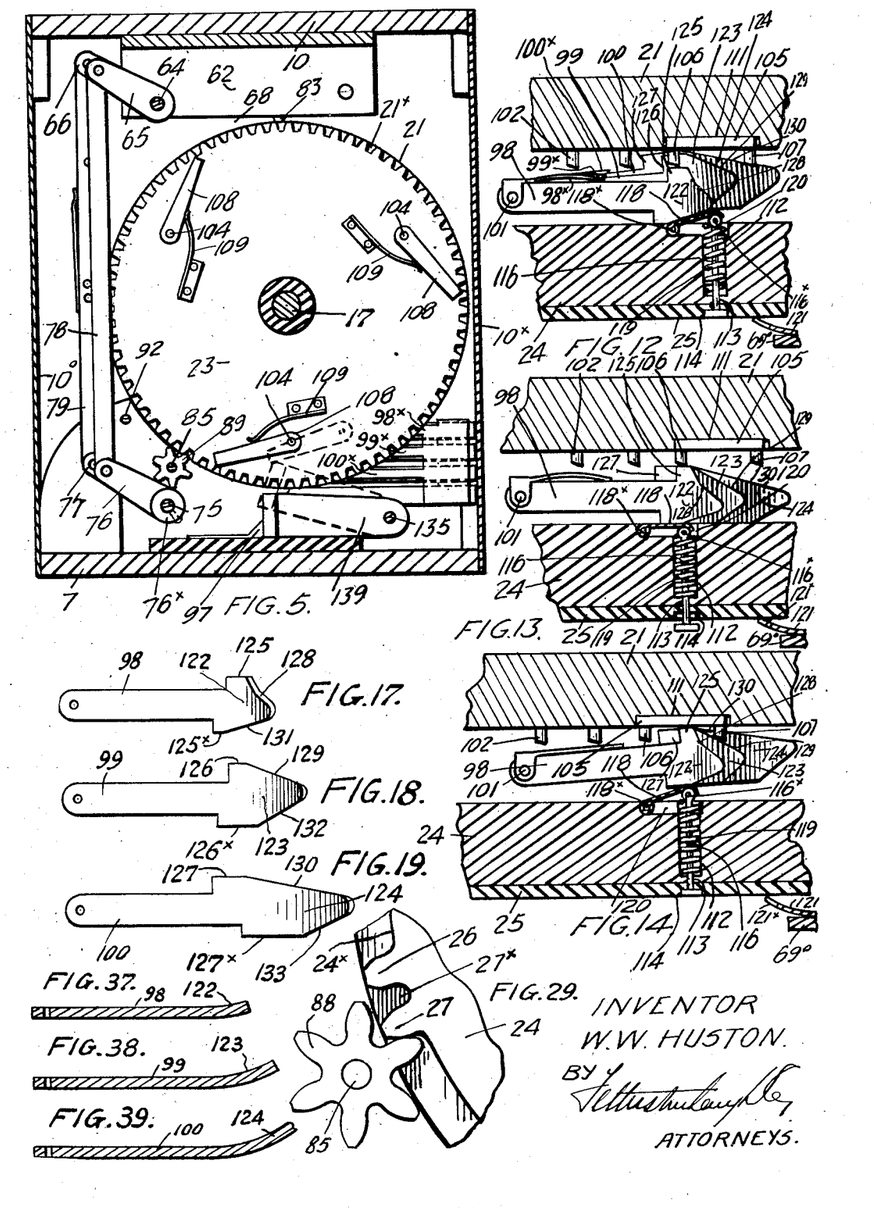
Fig. 5 is a cross sectional view on line 5—5 of Fig. 4.
Fig. 12 is a plan view of the cam mechanism located between the month indicating wheel and "the day of the month" indicating wheel and in the 29 day position when a 30 day month is indicated.
Fig. 13 is a similar view to Fig. 12, the cam mechanism being shown in the 30 day position in a 30 day month.
Fig. 14 is a similar view to Figs. 12 and 13 showing the mechanism in a 30 day position for a 31 day month.
Fig. 17 is a plan detail of the cam employed in a 30 day month.
Fig. 18 is a plan detail of the cam employed in a 29 day month.
Fig. 19 is a plan detail of the cam employed in a 28 day month.
Fig. 29 is a face elevation of the "day of the month" pinion and a fragmentary portion of the "day of the month" wheel with which it engages.
Figs. 37, 38 and 39 are longitudinal sectional views respectively through Figs. 17, 18 and 19.

Each pin of the 30ᵈ circle opposite the November indication of the inner indicating circle 103 is formed by a short shaft 104 on the projecting end of which is secured an arm 105 provided with a hub 106 which takes the place of one of the pins 102. The opposite end of the arm is provided with a projection 107 which is normally located on the 28ᵈ circle. The opposite end of the shaft 104 is provided with an arm 108 against which a spring 109 bears (Fig. 5). By this means the arms 105 are normally held against stationary pins 110 (Fig. 10). The face of the wheel 21 is recessed at 111 so that the face of the arm 105 is flush with the face of the wheel 21.

The "day of the month" wheel is provided with a bore 112 having a small central orifice 113 at the lower end and extending also through the gear 25 into a recess 114. A longitudinally movable pin 116 extends through the bore 112 and orifice 113 and is provided, at its outer end, with a circular head 117 corresponding in size to the size of the recess 114. A plate 118 is hingedly mounted at 118× in a recess 120 formed in the opposite face of the wheel 24 and to the inner face of such plate the adjacent end of the pin 116 is loosely connected at 116×. A compression spring 119 extends between the bottom of the recess 112 and the plate 118.

As clearly seen in Fig. 7 the end 69⁰ of the lever 69 is enlarged into segmental form to carry a spring finger 121 and is provided with an inwardly bent forked lower end 121× which is in circumferential alignment with the pin 116.

It will be noted by referring to Figs. 17 to 19 that the cam bars 98, 99 and 100 are provided with heads 122, 123 and 124 which are somewhat triangular in form, the broad base portion of each head being exactly equal in width to the distance between the outer ends of the pins 102 and the opposite face of the wheel 24. The heads 122, 123 and 124 are provided with pin bearing faces 125, 126 and 127 and inclined pin engaging faces 128, 129 and 130. The opposite side of the heads are inclined at 131, 132 and 133 (see Figs. 17, 18 and 19) to form engaging faces 125×, 126×, and 127× for the cam plate 118. It will be noted on referring to Fig. 7 that the cam bar heads 122, 123 and 124 are curved upward concentric to the indicating wheels or to the path of travel of the pins 102.

Mounted in the standard 16 and in the bracket 134 is a rocking shaft 135 on one end of which is secured a cam arm 136 having an inclined face 137 with which pins 138 successively engage (Figs. 2, 3 and 9). A pin 138 corresponds to each leap year and these pins are placed in such a position (see Fig. 11) that when a leap year is exhibited through the exhibiting orifice 12⁰ the corresponding pin 138 will engage the inclined face 137 of the cam arm 136. An arm 139 is secured to the opposite end of the shaft 135 directly beneath the path of travel of the spring pressed arm 108 (Fig. 5).

When a leap year is exhibited through the exhibiting orifice 12⁰, for instance the year 1936, the pin 138× of the pins 138 swings the arm 136 to the dotted position (see Fig. 9). By this means the arm 139 is raised into the dotted position shown in Fig. 9 and into the path of the spring pressed arms 108 (Fig. 5) forcing them inward and rocking the shaft 104 to carry the arm 105 inwardly and the projection 107 into the 29ᵈ circle.

When a thirty day month, such as November, is brought opposite to the exhibiting orifice 11⁰, the corresponding pin 102 is carried by the rotation of the month wheel 21 directly opposite to the contact face 125 of the thirty day cam lever, thereby holding the opposite face 125× of the head 122 in close contact with the face of the "day of the month" wheel 24 so that as the "day of the month" wheel is rotated to the twenty-ninth day exhibiting position, the cam plate 118 is carried into contact with the cam face 131 in the position shown in Fig. 12.

By the next rotary movement carrying the wheel 24 to the thirty day exhibiting position, the cam plate 118 is depressed into the position shown in Fig. 13 forcing the head 117 to the projecting position indicated and into the path of the forked end 12× of the spring plate 121. The lever end 69⁰ is swung downwardly every twenty-four hours by mechanism which I will now describe, which mechanism is actuated from the hour shaft. The minute shaft 12 rotates the gear 56 once in every twenty-four hours in a clockwise direction by means of the gears 47, 49 and 50, the gear 50 also driving the hour shaft 13.

Figure 4:
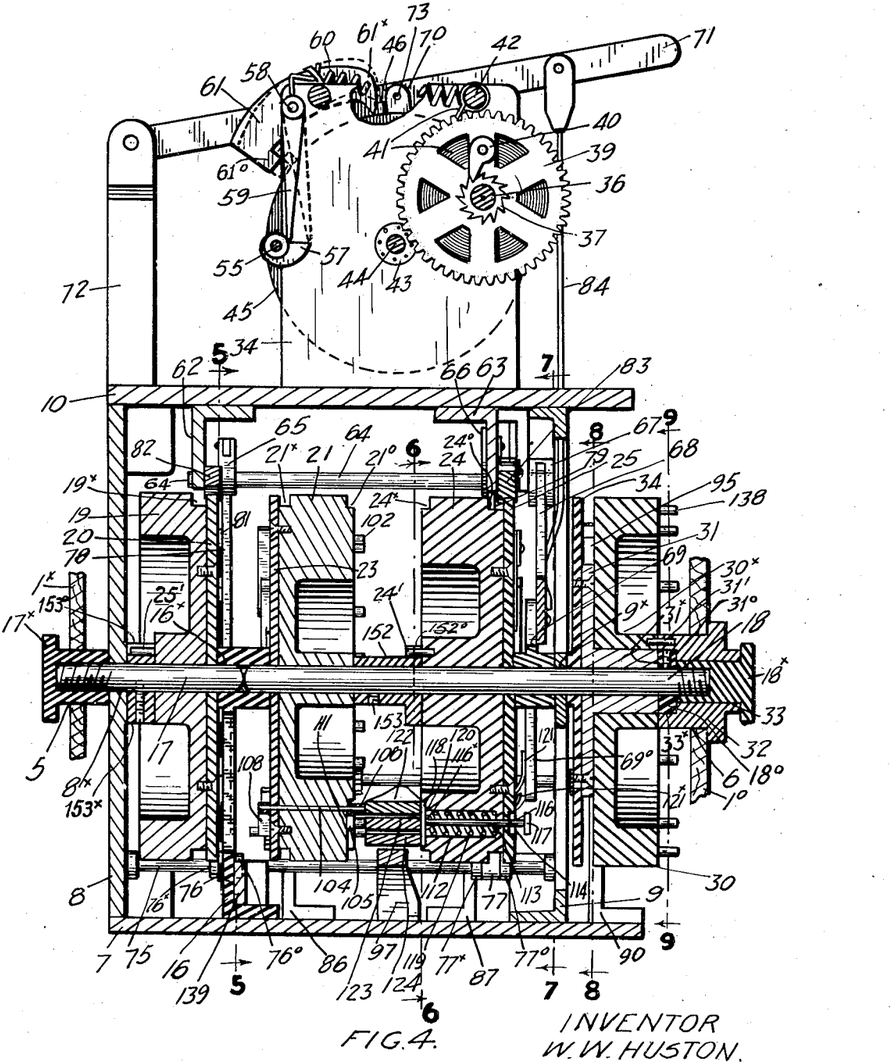
Fig. 4 is a sectional view extending longitudinally of the mechanism shown in Figs. 2 and 3.

The gear 56 is secured to the shaft 55 as is also the cam 57. The rotation of the cam 57 trips the tripping finger 59 once in every twenty-four hours (see Fig. 4). The tripping finger 59 is secured to the shaft 58 as is also the escapement detent 61. The cam 57 in its rotation to the tripping point gradually forces the finger 59 inwardly so as to rock the detent upwardly at 61× to release the pin 46 and the crank disc 45 which is then driven by the spring 41 until the pin 46 engages the projection 61⁰ of the detent 61 which has been swung inwardly as the detent releases the pin 46 at 61×. When the cam 57 trips the finger 59, the spring 60 swings the finger 59 towards the shaft 55 and thereby rocks the detent upwardly at 61⁰ to release the pin 46 from the projection 61⁰. When the pin 46 is released from the projection 61⁰, the crank wheel 45 revolves swinging the lever end 69⁰ first downwardly and then upwardly by means of the connecting link 70, lever 71 and link 84. By the downward swing of the lever end 69⁰, the fork end 121× engages beneath the head 117 of the pin 116 holding the pin 116 in its outward position while forcing such pin 116 forward to rotate the "day of the month" wheel from the thirty day position to the first day position of the next month. It will, of course, be understood that the pawl 81 still reciprocates normally but when the "day of the month" wheel 24 and the ratchet 25 are rotated the teeth of the ratchet 25 slip past the pawl being rotated the space of two teeth by the coacting pin 116 and fork 12×.

It will also be understood that during the normal operation of the pawl 81 rotating the "day of the month" wheel one day at each operation as in a thirty-one day month, the fork 121× of the lever end 69⁰ operates idly as the pin 116 is not forced out to a fork engaging position.

As there are thirty-one days in December and January, no pins of the month wheel engage any of the cam bars 98, 99 and 100 and the cams assume the position shown in Fig. 14, being forced by the spring pressed cam plate 118 in between the pins 102.

As February, the next succeeding month, has normally only twenty-eight days, the pin projection 107 at the end of the swinging arm 105 and on the 28ᵈ circle engages the contact face 127 of the cam arm 100. The cam plate 118 engages the inclined edge 133 of the cam arm 100 as the wheel 24 passes from the twenty-seven day position to the twenty-eight day position so that on the twenty-eighth the head 117 is forced outward at the twenty-eight day position. It may be pointed out that the lever end 69⁰ swings down on the twenty-eighth day of February performing its normal movement causing the twenty-eighth day to appear in the viewing orifice 12×. Also on the same day, the pin 116 is forced out by the plate 118 after the forward passage of the fork 121× and as the lever 69⁰ returns the spring finger 121 springs over the projecting pin 116 to pass into its normal position so that by the next forward movement the finger engages the pin to rotate the wheel 24 to the first day position of the next succeeding month.

In order to simultaneously change the month wheel from one month to the next succeeding month, the teeth 26 and 27 on the "day of the month" wheel engage with the pinion 88 as the "day of the month" wheel rotates from the last day of one month to the first day of the next month. The rotation of the pinion 88 rotates the shaft 85 which in turn rotates the pinion 89 secured thereon and which is in mesh with the gear 23 of the month wheel rotating the month wheel one month space at each operation.

On the next downward swing of the lever end 69⁰, the fork 121ˣ engages the pin 116, before the pawl 81 engages a tooth of the ratchet 25 in performing its normal movement, carrying the wheel 24 from the twenty-eight day exhibiting position past the twenty-ninth, thirtieth and thirty-first day positions to the first day position of the next succeeding month, the corresponding teeth of the ratchet 25 slipping freely past the pawl 81.

As before stated the rod 84 is operated every twenty-four hours upon the release of the crank wheel 45. The longitudinal movement of the rod 84 operates the lever 69 to swing a distance equal to four tooth spaces of the ratchet 25 and, at the same time, operates the bar 79 longitudinally, the stroke of the bar 79 being sufficient to rotate the ratchet 25 one tooth space at each operation. The normal or tooth by tooth operation to rotate the "day of the month" wheel from one day to the next day is performed by the pawl 81, the lever 69 swinging during each operation of the pawl 81.

The spring finger 121 of the lever 69 only functions when the pin 116 is forced out by the pins 102, 106 or 107 coacting with the cam members 98, 99 and 100 to force the plate 118 flush with the "day of the month" wheel, the point at which the pin 116 is forced out being controlled by the cam members 98, 99 and 100. The springs 98ˣ, 99ˣ and 100ˣ normally hold the cams 98, 99 and 100 against the "day of the month" wheel 24 except when raised plate 118 forces them up against the wheel 21 when a month has thirty-one days and no pin is in the way to force the cams down and force the pin 116 out. If it is forced out at the point A (See Fig. 7) the swing of the lever 69 engages the fork 121ˣ therewith to rotate the ratchet four tooth spaces and rotate the "day of the month" wheel from the twenty-eight day position to the first day position of the next month. If the pin 116 is forced out at the point B, the ratchet wheel is only rotated three tooth spaces carrying the "day of the month" wheel from the twenty-nine day position to the first day of the next succeeding month. If the pin is forced out at the point C, the ratchet 25 is only rotated two tooth spaces carrying the "day of the month" wheel from the thirty day position to the first day position of the next month. The swing of the lever 69 always remains the same, each swing corresponding to one movement of the pawl 81. Therefore, the movement of the ratchet is faster when rotated by the lever 69 than when rotated by means of the pawl 81 causing the teeth of the ratchet to slip by the pawl 81 when the ratchet is operated by the lever 69 and fork 121 engaging the pin 116. The above construction will be more fully explained later on in the specification.

In each leap year, February having twenty-nine days, such as the year 1936, the operation is the same as for a twenty-eight day month with the exception that the twenty-nine day lever 99 is held from movement by the pin projection 107 when on the 29ᵈ dotted circle indicated in Fig. 10 instead of the cam lever 100 which is now unsupported by the pin projection 107. At the end of each day the tripping mechanism including the cam 57 driven from the hour shaft, tripping finger 59 and detent 61 releases the crank disc 45 which is then spring driven by the spring 41 and is connected to the rod 84 to reciprocate it to swing the lever 69 and through which the bar 79 is reciprocated to operate the pawl 81 to rotate the ratchet 25 a tooth at a time and the "day of the month" wheel a day space at a time. By this means, when the "day of the month" wheel is rotated to the twenty-eight day exhibiting position, the cam plate 118 engages the inclined edge 126ˣ and as it rotates to the twenty-nine day position forces the head 117 outwardly so that by the next downward movement of the lever end 69⁰ the pin 116 is engaged by the fork 121ˣ. By the swinging movement of the lever 69, the ratchet 25 is rotated three tooth spaces and the "day of the month" wheel three day spaces, carrying the "day of the month" wheel from the twenty-nine day exhibiting position to the first day exhibiting position of the next succeeding month. Thereafter the "day of the month" wheel, when the month wheel is changing from March, May, July, August and October having thirty-one days in the month, to the next succeeding month, is controlled by the ratchet wheel 25 and pawl 81 only in a continuous even step by step movement from month to month. The months of April, June and September having thirty days in the month are controlled by the means described in connection with the month of November.

It will be noted that the month wheel is provided with three sets of twelve months, that is the indications of January to December inclusive appear on each one-third of the periphery of the month wheel. At the end of each one-third revolution of the month wheel a tooth of the pinion 93 is engaged by the teeth 28 and 29 of the month wheel thereby turning the shaft 92 and the pinion 94 in mesh with the gear 34 connected to the gear wheel 30 to rotate it a year space.

As has been before described the "day of the month" wheel is rotated either by the ratchet pawl 81 or the fork 121ˣ engaging the pin 116. The teeth 26 and 27 are located opposite the thirty-one day peripheral indication of the "day of the month" wheel and, therefore, when brought into engagement with the pinion 88 rotates such pinion as the "day of the month" wheel passes from the thirty-one day indication to the first day indication of the next month so as to rotate the month wheel to the next succeeding month through the shaft 85, pinion 89 and gear 23.

Normally the pin 107 is in the twenty-eight day position to coact with the lower cam bar member 100 to hold such member stationary against the wheel 24 and force out the pin 116 when the plate 118 engages the cam member 100 so that the finger 121 engages the pin 116 at the position A (see Fig. 7) or the twenty-eight day position. In leap year the pin 107 is moved inwardly to the twenty-ninth day position or the position indicated by dotted lines in Fig. 10.

As the year wheel is rotated from year to year in the manner above described, the pins 138 located in the wheel 30 opposite each fourth or leap year indication engage the cam arm 136 to rock it outwardly thereby rocking the shaft 135 in the same direction, raising the arm 139 into the path of the free ends of the arms 108, and rocking these arms and the shaft 104 inward together with the arms 105 secured to such shaft. By this means the pin 107 is carried to the twenty-ninth day position or the dotted position shown in Fig. 10. In this position the pin 107 coacts with the shorter cam member 99 instead of with the cam member 100 so that the depression of the plate 118 is delayed forcing out the pin 116 at the position B or the twenty-ninth day position (see Fig. 7) instead of at the position A and the "day of the month" wheel is not rotated by the finger 121 until the twenty-ninth day appears in the orifice 12× to conform to the number of days in February in leap year.

In the event of the clock stopping, it may be necessary to know whether the hour at which it stops is A. M. or P. M. In order to do this I have provided the following device:

On the hour shaft 13 is secured a cam 140. The gear 56, hereinbefore referred to, is secured to a cylindrical member 141 in which is fitted an inner cylindrical member 142 fitting at one end against the gear 56 and projecting from the opposite end and provided with a circular head 143. The members 141 and 142 are secured to the shaft 55 by a diametric pin 144. A disc 145 is revolvably mounted on the projecting portion of the cylindrical member 142 and the head 143, the outer face of the disc being recessed to receive the head 143. A disc 146 is secured to the disc 145. One half of the disc 146 is white to represent A. M. and the other half is black to represent P. M. Pins 147 and 147× project radially from the disc 145 and contact alternately against the periphery of the cam 140. A pin 148 projects from the cylinder 141 secured to the shaft 55 and a pin 149 extends laterally from the disc 145 and is connected by a tension spring 150 to the pin 148. An exhibiting orifice 151 is made in the clock dial through which a portion of the disc 146 is seen.

Figure 26:
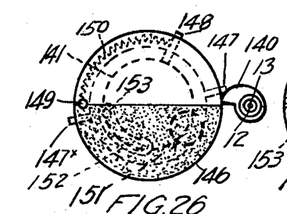
Figs. 26 to 28 inclusive show the means for changing the A. M. and P. M. indicating means.
Figures 27, 28:
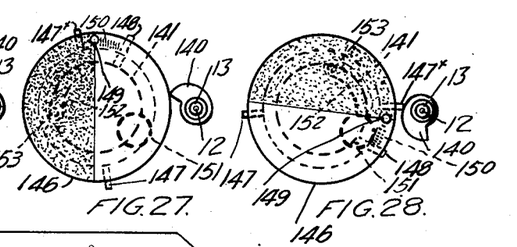

At twelve o'clock midnight the pin 147 passes off the nose of the cam 140 as the cam revolves clockwise freeing the disc 146 to revolve by means of the tension of the spring 150 exerted on the pin 149. The spring 150 rotates the disc 146 behind the orifice 151 so as to expose the white portion of the disc therethrough to indicate A. M. as shown in Figs. 26 and 27. After the disc 146 is turned to exhibit the white area the disc is rotated to carry the pin 147× into engagement with the cam 140, such rotation being effected by the gear 56 driven from the hour shaft and connected to the disc by the pins 148 and 149 and spring 150.

When the pin 147× engages the cam it is held thereby stationary, the gear 56 continuing to revolve and thus drawing the spring 150 again into tension. When the cam 140 releases the pin 147×, the disc 146 again rotates by the spring 150 so as to carry the black area again into position behind the viewing orifice 151. The rotation of the disc 146, as the white area behind the viewing orifice is changed to the black area or vice versa, is limited by the slot 152 formed in the disc 145 and the pin 153 extending from the cylinder 141.

Having described the principal parts involved in my invention I will briefly describe the operation of the same.

The cam 57 is driven in a clockwise direction from the minute shaft 12 through the pinion 47, gear 49, pinion 50, gear 56 and shaft 55. As the hands of the clock approach midnight, the cam 57 swings the free end of the finger 59 outwardly from the shaft 55 rocking the shaft 58 in the same direction together with the detent 61 so that the nose 61× of the detent gradually clears the pin 46, and the projection 61° at the same time approaches the crank wheel 45 and passes into the path of the pin 46 as it is released from the nose 61× of the detent 61. When the nose 61× rises above the end of the pin, the crank disc 45 is revolved in a counterclockwise direction by the drive of the spring 41 until the pin 46 strikes the projection 61°, assuming the position illustrated in Fig. 22. At midnight the end of the finger 59 passes the nose of the cam 57 and drops to the dotted position shown in Fig. 23, swinging the projection 61° also to the dotted position and clear of the pin 46.

It will be understood that the rotation of the crank wheel carrying the pin 46 from the nose 61× of the detent 61 to the projection 61° of the detent has no effect on the actuation of the lever 71 as the pivot 74 of the link 70 is carried from one side of the vertical centre line of the crank wheel to an equal distance to the opposite side of such center line. When the pin 46 is released from the detent projection 61°, the crank wheel is driven by the spring 41 the rest of its revolution until the pin 46 again strikes the nose 61× of the detent 61 which has been carried inwardly as the projection 61° is carried outwardly to release the pin 46.

The rotation of the crank wheel 45 which is counterclockwise imparts one reciprocating movement to the lever 71, swinging the lever on its pivot in the bracket 72. This reciprocating movement is transferred to the main lever 69 by the link rod 84.

The main lever 69 performs two functions. The first is performed by the end 69× imparting to the "day of the month" wheel and to the day of the week wheel each a step movement from one day indication to the next day indication on each day. This movement is performed through the link 68 connected to the arm 67 secured to the rock shaft 64 thereby rocking the rock shaft as the lever end 69× reciprocates. This rocking of the rock shaft 64 swings the arms 65 and 66 downwardly imparting a downward longitudinal movement to the bars 78 and 79 and thereby carrying the pawls 80 and 81 into engagement with the teeth of the ratchet wheels 20 and 25 secured to the day of the week wheel and the "day of the month" wheel respectively. By this operation, the day of the week wheel and the "day of the month" wheel are each rotated one indicating day space, the pawls 80 and 81 then returning to their normal position. This operation is repeated each day rotating the "day of the month" wheel thirty-one day spaces in each revolution for each of the months of January, March, May, July, August, October and December.

As each revolution of the "day of the month" wheel is completed, the segment gear teeth 26 and 27 mesh with the pinion 88 so as to rotate the spindle 85 and pinion 89 to rotate the gear 23 and month wheel 21 one month space. Simultaneously the opposite end 69ᵉ of the main lever swings downwardly carrying the forked end 121× of the spring finger 121 over the face of the ratchet disc 25 and over the countersunk head 117 of the pin 116. Normally this movement of the fork 121× is an idle movement performing no function.

As April, June, September and November have only thirty days it is necessary to skip the thirty-one day indication of the "day of the month" wheel and in February, which normally has only twenty-eight days, the twenty-nine, thirty and thirty-one day indications must be skipped. For this purpose a pin 107 coacts with the cam piece 100 when the February indication is seen in the viewing orifice 110 of the casing and a pin 102 coacts with the cam piece 98 when either the months of April, June, September or November is seen in the viewing orifice 110.

In January, the operation is normal, that is the pawl 81 operates each day of the thirty-one days of the month to turn the "day of the month" wheel a day space. By referring to Fig. 10 it will be seen that no pin is opposite January or any thirty-one day month so that the cam pieces are free to move away from the face of the wheel 24 when engaged by the plate 118, the pin 116 and its head 117 remaining in their normal inoperative position for these months. When the month of February is seen in the viewing orifice 110, the pin 107 in the position shown by full lines in Fig. 10 engages behind the cam piece 100 so that it cannot be moved away from the face of the "day of the month" wheel 24 with which it normally contacts.

As the lever end 69⁰ descends on the twenty-eighth day of February, it passes the head 117 when such head is flush with the face of the ratchet wheel 25. The plate 118, as the "day of the month" wheel revolves, engages the cam piece 100 which is the longest of the cam pieces 98, 99 and 100 and which, being held stationary by the pin 107, depresses the plate 118 to a flush position with the face of the "day of the month" wheel forcing the pin 116 and head 117 to a position projecting from the opposite face of the "day of the month" wheel at the point A (Fig. 7). The lever end 69⁰ then returns, the forked end 121× of the spring finger 121 springing over the projecting portion of the pin 116 and head 117 into position to engage the pin by the next downward movement of the lever end 69⁰. On the next downward movement of the lever end 69⁰, the forked end 121× of the spring finger 121 engages the pin 116 before the pawl 81 engages the next tooth of the ratchet 25 and rapidly rotates the ratchet wheel 25 and the "day of the month" wheel so that the ratchet teeth corresponding to the twenty-nine, thirty and thirty-one day indications pass downwardly beneath the pawl 81 and the "day of the month" wheel is rotated so that the twenty-nine, thirty and thirty-one day indications rapidly pass the orifice 12× of the casing so that the next number appearing in a stationary position in such orifice will be one representing the first day of the next month.

The month of March having thirty-one days, the operation is normal as in January, that is the pawl 81 engages each tooth of the ratchet 25 rotating the "day of the month" wheel a day space as each tooth is forced downwardly a tooth space by the pawl 81, the pin 116 and head 117 remaining in their inoperative positions.

The month of April only having thirty days, the operation is similar to that for February except that a corresponding pin 102 engages behind the short cam piece 98 and the plate 118 engages such cam to force the pin 116 outwardly at the point C (Fig. 7) to be engaged by the fork 121× so the movement of the ratchet wheel 25 is advanced in relation to its movement by the pawl 81 carrying the thirty-one day indication of the "day of the month" wheel rapidly past the orifice 12× to exhibit the first day indication therein.

For May, July, August, October and December the operation is the same as that above described for January and March, and for June, September and November the operation corresponds to that described for the month of April.

At the end of each ⅓ revolution of the month wheel, the year wheel 30 is rotated one year space by means of the segment teeth 28 and 29 of each twelve month period of the month wheel meshing with the pinion 93 to transfer to the year wheel a year period turning the year wheel one year space through the spindle 92, pinion 94 and gear 34 connected to the year wheel 30.

Figure 11:
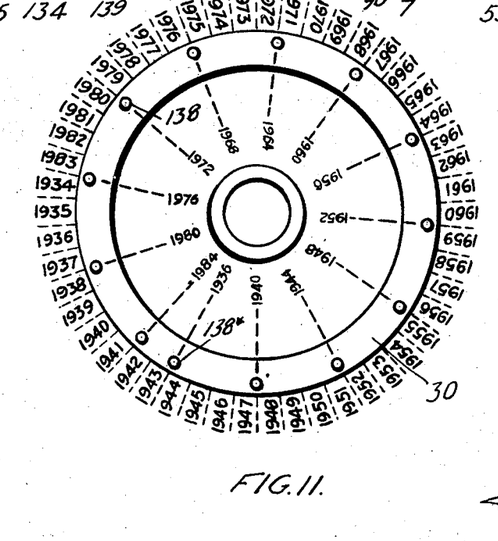
Fig. 11 is a face elevation of the year wheel and indicating the relative position of the actuating pins on the wheel face to the year indications on the wheel periphery.

The aforesaid operations are repeated for the years 1934 and 1935 and for all years other than leap years. As 1936 is a leap year, a pin 138× of the pins 138 of the year wheel and corresponding to the year 1936 as shown in Fig. 11 engages the arm 136 moving the arm to the dotted position (see Fig. 9) and thereby rocking the shaft 135 in the same direction swinging the arm 139 upwardly to the dotted position shown in Fig. 5 into the path of the spring pressed arm 108 moved in a circular path by the rotation of the gear 23 and month wheel 21. The arm 108 is thereby swung inwardly rocking the shaft 104 in the same direction together with the arm 105 which carries the twenty-eight and twenty-nine day pin 107 moving such pin from the twenty-eight to the twenty-nine day position shown by dotted lines in Fig. 10. As the month wheel revolves with the pin 107 in the twenty-nine day position, it is brought into engagement with the cam piece 99 which is longer than the cam piece 98 and shorter than the cam piece 100. The rotation of the "day of the month" wheel carries the plate 118 into contact with the cam piece 99 held stationary by the pin 107 so as to depress the plate 118 to a position flush with the face of the "day of the month" wheel forcing the pin 116 and head 117 to a position projecting from the opposite face of the "day of the month" wheel. The downward swing of the lever end 69⁰ engages the fork 121× with the pin 116 at the position B (see Fig. 7) so as to rotate the "day of the month" wheel from the twenty-nine day position to the first day position skipping the thirty and thirty-one day positions in the viewing orifice 12×.

The pin 24¹ and the sleeve 152 having the slot 152⁰ coact with the "day of the month" wheel as follows for the purpose of ensuring that the holding dog 83 engages with the teeth of the ratchet wheel 25. The day of the week wheel has similar operating parts which function in exactly the same manner.

Figures 30, 31, 32, 33, 34, 35, 36:
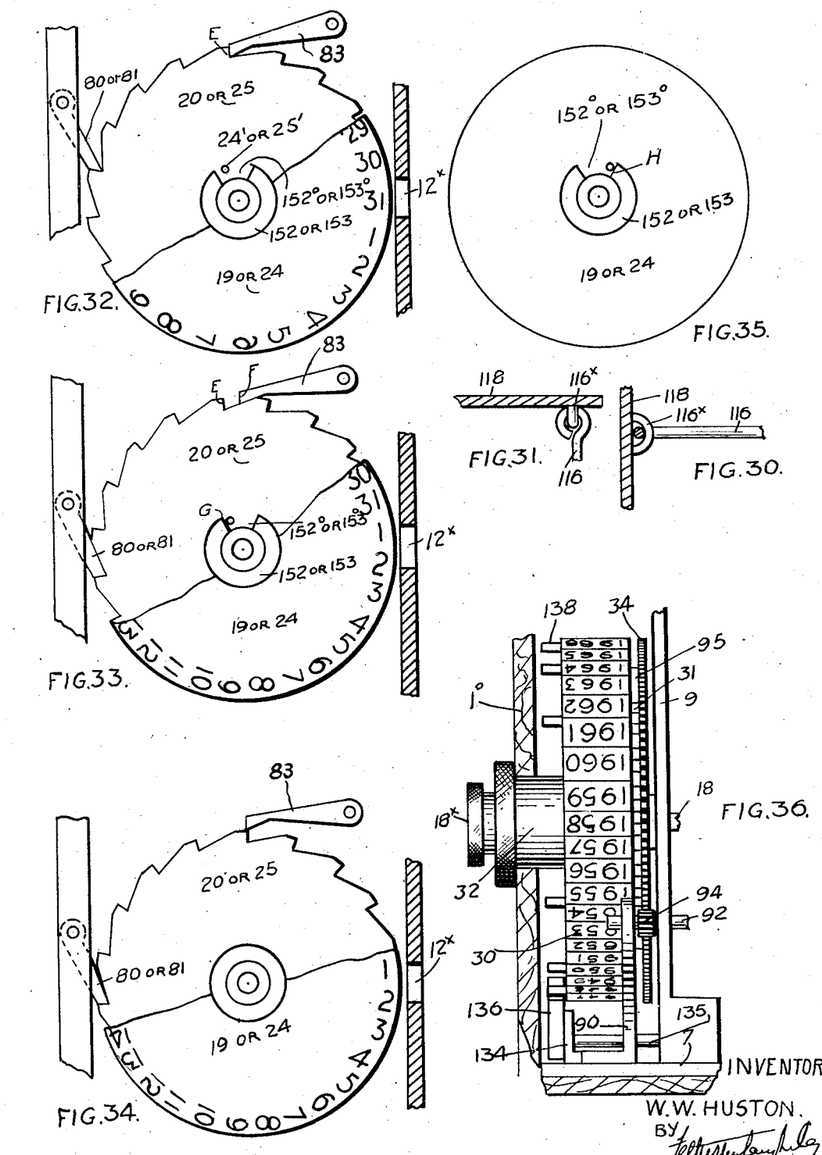
Figs. 30 and 31 are details showing the connection between the movable pin and cam plate.
Figs. 32 to 35 illustrate the lost motion connection between the main indicating wheel supporting shaft and the "day of the month" and day of the week indicating wheels, these wheels being identical in so far as their showing in these figures is concerned.
Fig. 36 is a detail elevation of the year wheel and adjacent parts.

In Fig. 32 the ratchet wheel 25 is shown in the normal position, the pawl 81 in position to make its downward movement and the dog 83 engaged with the ratchet teeth. In this position the day indication 31 is viewed through the orifice 12× of the casing in a centred position. Also the pin 24¹ is relieved from shoulder G of the slot 152⁰.

After the pawl 81 has made its downward movement, the parts assume the position shown in Fig. 33, the dog 83 engaging in the teeth of the ratchet with a clearance as shown at E, F and the next day indication which is "1" assuming a position above the centre of the orifice 12×. The sleeve 152 is rotated by the pin 24¹ engaging the face of the slot shoulder G. As the pawl 81 returns upward its frictional contact with the ratchet gear 25 rotates these gears in a reverse direction carrying the indication "1" to a centred position in the orifice 12×. This movement is limited by the dog 83 engaging the tooth shoulder E. If the clearance E, F was not provided the dog 83 might not drop into engagement with the teeth of the ratchet 25 but assume the position shown in Fig. 34 at the end of the down stroke of the pawl 81 and consequently as the pawl returns upward it would rotate the gears 25 by frictional contact back to their original position.

Furthermore when the pawl 81 returns upward, its frictional contact with its ratchet wheel would not be sufficient to turn the ratchet and shaft if connected directly to such shaft and also carrying the weight of the indicating wheel, preventing the centering of the indications in the orifice 12×.

When the "day of the month" wheel is set by hand, the pin 24¹ is engaged by the shoulder H (see Fig. 35) as the sleeve 152 is rotated. If the knob 18× is rotated too far when the pin 24¹ is in engagement with the shoulder H, the rotation of the knob 18× may be reversed so that the shoulder G engages the pin 24¹ to carry the indicating wheels to the correct position.

Similarly when the day of the week wheel is set by hand, the pin 25¹ is engaged by the shoulder of the collar 153× corresponding to the shoulder H of the sleeve 152 as the collar is rotated. If the knob 17× is rotated too far when the pin 25¹ is in engagement with the aforesaid shoulder, rotation of the knob 17× may be reversed so that the shoulder of the collar 153× corresponding to the shoulder G of the sleeve 152 engages the pin 25¹ to carry the day of the week wheel to the correct position.

From this description it will be seen that I have devised means actuated from a time clock for successively indicating from day to day the days of the week, days of the month, months and years forming an automatically operated calendar for a long period of years such as fifty years to which the foregoing device as illustrated is adapted.

What I claim as my invention is:

1. In a calendar mechanism, a month wheel and a "day of the month" wheel, a main supporting shaft on which the aforesaid wheels are mounted, a main lever swung intermediately of its length on the main supporting shaft, means for imparting a reciprocation to the main lever at the end of each twenty-four hours, means operated by one end of the main lever for imparting a day step rotary movement to the "day of the month" wheel, means operated by the other end of the main lever for imparting to the "day of the month" wheel a movement equal to a plurality of day spaces of such wheel, and means actuated from the month wheel for timing the last mentioned movement and controlling the number of day spaces comprising each movement.

2. In a calendar mechanism, a month wheel, a "day of the month" wheel and a year wheel having year indications, each fourth one of which is a leap year indication, a main supporting shaft on which the aforesaid wheels are mounted, a main lever swung intermediately of its length on the main supporting shaft, means for imparting a reciprocation to the main lever at the end of each twenty-four hours, means operated by the inner end of the main lever for imparting a day step rotary movement to the "day of the month" wheel, means operated by the other end of the main lever for imparting to the "day of the month" wheel a movement equal to a plurality of day spaces of such wheel and comprising a thirty day cam bar, a twenty-nine day cam bar and a twenty-eight day cam bar pivoted between the month wheel and the "day of the month" wheel and individually spring held against the face of the "day of the month" wheel opposing the month wheel, a pin corresponding to each thirty day month extending from the face of the month wheel and bearing against the thirty day cam when the corresponding month indication is in the viewing position to positively hold the said thirty day cam against the "day of the month" wheel, a movable pin also extending from the face of the month wheel and bearing against either the twenty-eight or twenty-nine day cam when a twenty-eight or twenty-nine day indication is in the viewing position to positively hold the corresponding cam against the "day of the month" wheel, a spring held pin extending through the "day of the month" wheel, and means coacting with the aforesaid cam bars and pins for forcing said last named pin outwardly into the path of the outer end of the reciprocating main lever to be engaged thereby to rotate the "day of the month" wheel a plurality of day spaces, and means operated from the year wheel for moving the twenty-eight or twenty-nine day or movable pin into position to engage the corresponding twenty-eight or twenty-nine day cam.

3. In a calendar mechanism as claimed in claim 2 in which the means for moving the twenty-eight or twenty-nine day or movable pin comprises a rock shaft journalled in the month wheel, an arm carried at one end of the shaft and on which the twenty-eight or twenty-nine day or movable pin is mounted, a spring pressed arm at the other end of the shaft, a pin extending from the face of the year wheel and corresponding to each leap year indication on the year wheel periphery, a second rock shaft, and bearings in which the second rock shaft is journalled, a cam arm at one end of said second rock shaft spring held in the path of the year wheel pins, and an arm secured to the opposite end of the rock shaft and adapted to be moved into the path of the spring pressed arm of the month wheel to rock the rock shaft of the month wheel when the cam arm is depressed by a year wheel pin at each leap year to thereby carry the twenty-eight or twenty-nine day or movable pin to the twenty-nine day position.

4. In a calendar mechanism, a main supporting shaft, wheels mounted on the shaft and having calendar indications on their periphery, a main operating lever, a driving spring, mechanism operated by the spring for reciprocating the main lever, a trippable device for holding the main lever operating mechanism from normally functioning, means for tripping such device to impart a reciprocation to the main lever at predetermined intervals, and means operated by each reciprocation of the main lever for rotating one of said calendar wheels an indicating space.

5. In a calendar mechanism, a main supporting shaft, a "day of the month" wheel and a month wheel mounted on the shaft, a main operating lever, a driving spring, mechanism operated by the spring for reciprocating the main lever, a trippable device for holding the main lever operating mechanism from normally functioning, means for tripping such device to impart a reciprocation to the main lever, means operated by each reciprocation of the main lever for rotating the "day of the month" wheel an indicating day space, and driving means between the "day of the month" wheel and the month wheel for rotating the month wheel a month space at the end of each revolution of the "day of the month" wheel.

6. In a calendar mechanism, a main supporting shaft, a "day of the month" wheel, a month wheel and a year wheel mounted on the supporting shaft, a main operating lever, a driving spring, mechanism operated by the spring for reciprocating the main lever, a trippable device for holding the main operating lever from normally functioning, means for tripping such device to impart a reciprocation to the main lever, means operated by each reciprocation of the main lever for rotating the "day of the month" wheel an indicating space, driving means between the "day of the month" wheel and the month wheel for rotating the month wheel a month space at the end of each revolution of the "day of the month" wheel, and driving means between the month wheel and the year wheel for rotating the year wheel a year space at the end of each twelve month indication of the month wheel.

7. In a calendar mechanism, a main supporting shaft, a "day of the month" wheel and a month wheel mounted on the supporting shaft, a main operating lever, a driving spring, mechanism operated by the spring for reciprocating the main lever, a trippable device for holding the main lever mechanism from normally functioning, means for tripping such device to impart a reciprocation to the main lever, means operated by each reciprocation of the main lever for rotating the "day of the month" wheel an indicating day space, a two toothed segment rotating with the "day of the month" wheel, a gear rotating with the month wheel, a spindle, bearings in which the spindle is mounted, a pinion on one end of the spindle, with which said two toothed segment on the "day of the month" wheel is adapted to mesh as the "day of the month" wheel completes each revolution, and a pinion at the opposite end of the spindle meshing with the gear of the month wheel.

8. In a calendar mechanism, a main supporting shaft, a "day of the month" wheel, a month wheel the periphery of which is divided into a plurality of divisions, each division comprising twelve sub-divisions forming indicating spaces numbered from one to twelve and a year wheel mounted on the supporting shaft, a main operating lever, a driving spring, mechanism operated by the spring for reciprocating the main lever, a trippable device for holding the main operating lever from normally functioning, means for tripping such device to impart a reciprocation to the main lever, means operated by each reciprocation of the main lever for rotating the "day of the month" wheel an indicating space, a two toothed gear segment rotating with the "day of the month" wheel, a gear rotating with the month wheel, a spindle, bearings in which the spindle is mounted, a pinion on one end of the spindle and with which the gear segment is adapted to mesh as the "day of the month" wheel completes each revolution, a pinion at the opposite end of the spindle meshing with the gear of the month wheel, a gear rotating with the year wheel, two toothed segments on the month wheel, one of such segments for each division thereof, spindle bearings, a spindle mounted in such bearings, a pinion on one end of the spindle meshing with the gear of the year wheel, and a pinion on the opposite end of the spindle with which the segment of the month wheel engages at the end of a twelve month indication thereof.

9. In a calendar mechanism, a month wheel and a "day of the month" wheel, a shaft on which the month wheel and "day of the month" wheel are mounted, a main lever, a support in which the lever is pivotally mounted intermediately of its length, means operated by one end of the main lever for imparting a day step movement to the "day of the month" wheel, means operated by the other end of the lever for imparting to the "day of the month" wheel a movement equal to a plurality of day spaces of such wheel, means actuated from the month wheel for controlling the number of day spaces comprising each movement, a shaft, a spring drive for the shaft, a crank disc and pin mounted on the shaft, a link and lever connection between the crank pin and main lever, a trippable device normally holding the crank disc and shaft thereof from rotation, and tripping mechanism for tripping such device.

10. In a calendar mechanism, a month wheel and a "day of the month" wheel, a shaft on which the month wheel and "day of the month" wheel are mounted, a main lever, a support in which the lever is pivotally mounted intermediately of its length, means operated by one end of the main lever for imparting a day step movement to the "day of the month" wheel, means operated by the other end of the lever for imparting to the "day of the month" wheel a movement equal to a plurality of day spaces of such wheel, means actuated from the month wheel for controlling the number of day spaces comprising each movement, a shaft, a spring drive for the shaft, a crank disc and pin mounted on the shaft, a link and lever connection between the crank pin and main lever, a trippable device normally holding the crank disc and shaft thereof from rotation, and means for tripping such device, such means comprising a rock shaft, bearings in which the rock shaft is mounted, an escapement detent secured to the rock shaft, a pin extending from the periphery of the crank disc and coacting with the detent, a finger secured to the rock shaft, a cam shaft, a driving source for the cam shaft, a cam secured to the cam shaft, and a spring for forcing the finger against the cam periphery.

WILLIAM WARDEN HUSTON.